United States Patent [19]

Tan et al.

[11] 4,361,675

[45] Nov. 30, 1982

[54] COMPATIBLE POLYSTYRENE BLENDS

[75] Inventors: King-Han Tan, Alkmaar; Jan L. de Greef, Amsterdam, both of Netherlands

[73] Assignee: Borg-Warner Corporation, Chicago, Ill.

[21] Appl. No.: 239,273

[22] Filed: Mar. 2, 1981

Related U.S. Application Data

[63] Continuation of Ser. No. 163,544, Jun. 27, 1980, abandoned, which is a continuation of Ser. No. 66,718, Aug. 15, 1979, abandoned.

[51] Int. Cl.³ .............. C08L 51/04; C08L 55/02; C08L 53/02
[52] U.S. Cl. ................................ 525/71; 524/504; 524/505
[58] Field of Search ......................................... 525/71

[56] References Cited

U.S. PATENT DOCUMENTS

| 3,873,645 | 3/1975 | Muirhead | 525/71 |
| 3,907,930 | 9/1975 | O'Grady | 525/71 |
| 3,994,836 | 11/1976 | Katchman | 525/71 |
| 4,075,285 | 2/1978 | Tabana | 525/71 |
| 4,195,136 | 3/1980 | Sato | 525/71 |
| 4,233,409 | 11/1980 | Bulkey | 525/71 |

FOREIGN PATENT DOCUMENTS

| 768231 | 8/1971 | Belgium | 525/71 |
| 4685 | 10/1979 | European Pat. Off. | 525/71 |
| 1077769 | 8/1967 | United Kingdom | 525/71 |

*Primary Examiner*—Paul Lieberman
*Attorney, Agent, or Firm*—Joseph Shekleton

[57] ABSTRACT

A blend of polystyrene, a block copolymer of styrene and certain conjugated diolefins, and a graft copolymer of styrene, acrylonitrile, and butadiene. Methyl methacrylate may be substituted for all or a portion of the acrylonitrile. The blend retains the good qualities of the individual polymers and is characterized by a stable compatibility.

7 Claims, No Drawings

COMPATIBLE POLYSTYRENE BLENDS

This is a continuation, of application Ser. No. 163,544 filed June 27, 1980, now abandoned, which is a continuation of Ser. No. 66,718, filed Aug. 15, 1979, now abandoned.

The invention of this application is a blend of polymers which has good impact strength, is flexible and yet hard, and has good resistance to scuffing. Moreover, the blended polymers are compatible with each other.

The above physical properties all are important in many applications. Automobile bumpers, for example, require these properties to a high degree. So does the material that is used in the manufacture of footwear, especially sport boots. Many other uses suggest themselves for a material having this combination of properties.

In almost all instances, the materials presently used for these applications are expensive, so that there is a strong incentive to develop a substitute. Polyurethanes are a typical raw material for the manufacture of ski boots, for example, but these polyurethanes are relatively expensive. Nevertheless, they have the rigidity of plastics and the resiliency of rubber and are thus well suited to this type of application.

The recent development of block copolymers from such monomers as styrene and conjugated dienes has made available a valuable raw material for many applications. In many cases such copolymers exhibit elastomeric properties at ambient temperatures and are thermoplastic at elevated temperatures. They exhibit the general characteristics of vulcanized rubbers but do not require vulcanization to attain these properties. Depending on the monomer composition, i.e., the proportion of styrene in the block copolymer, the properties of the polymer will resemble those of vulcanized rubber, as with a high conjugated diene content, or with a high styrene content the polymer will more nearly resemble a thermoplastic material such as a high impact polystyrene. The range of desirable possibilities is apparent and these block copolymers have found wide usage.

Nevertheless, for some uses, such block copolymers are not entirely satisfactory. Some of the required properties for sport boot material, for example, are hardness and scuff resistance and presently available block copolymers do not provide these properties to the extent desired.

Graft copolymers having a rubbery backbone likewise are very useful in a number of applications, because of their good impact properties, i.e., their resistance to breakage upon impact, and also because of their high gloss. These properties permit the use of these materials in the fabrication of business machines, telephones, television cabinets and the like. An insufficient flexibility, however, precludes their use in other applications.

The polymerization of styrene in the presence of a styrene-butadiene copolymer is shown in U.S. Pat. No. 3,062,777. Shell Chemicals Technical Bulletin RBX/76/3 shows the combination of styrene/butadiene/styrene block copolymers with polystyrene, with polyethylene and with polypropylene.

The present invention is a blend of polymers comprising (1) a block copolymer of styrene and a conjugated diolefin of 4-6 carbon atoms, (2) a graft copolymer wherein a polymer of styrene and up to 40 parts, based on the weight of graft copolymer, of acrylonitrile and/or methyl methacrylate is grafted onto a rubbery substrate which is polybutadiene or a copolymer of butadiene and styrene, and (3) polystyrene.

The above blend is characterized by good flexibility, hardness, resistance to impact, gloss, abrasion-resistance and scuff resistance. Moreover, its cost is much less than that of the polymer compositions which it would replace in the market. The unexpected compatibility of these polymers permits the formulation of a wide range of compositions having a corresponding range of the above desirable properties.

Block Copolymer

The conjugated diolefin generally is butadiene or isoprene, preferably butadiene; 2,3-dimethylbutadiene is also contemplated. The block copolymer is characterized by styrene end blocks with elastomeric diolefin center blocks, i.e., it has an ABA structure where B is an elastomeric polymer unit. A preferred embodiment is a styrene-butadiene-styrene block copolymer.

The block copolymers herein are linear and may be prepared by sequential anionic polymerization of styrene, the conjugated diolefin and, finally, styrene. Thus, for example, styrene is polymerized in the presence of an alkyl lithium catalyst to form a so-called "living polymer", butadiene is added to this living polymer to continue the polymerization with the formation of an intermediate block A-B-Li (still a living polymer), then more styrene is added to form a second polystyrene block, and finally a terminating agent is added. Alternatively, the A-B-Li living polymer may be coupled with itself. The result in either case is an ABA block copolymer. The polystyrene blocks each have a molecular weight between about 10,000 and 45,000 and the polystyrene block has a molecular weight between 35,000 and 150,000. The details of processes by which these block copolymers can be prepared may be found in U.S. Pat. No. 3,231,635; U.S. Pat. No. 3,239,478; 3,265,765, and Allport and Janes, "Block Copolymers" (pp. 81–87), Applied Science Publishers, London (1973).

Graft Copolymer

The graft copolymers of this invention may be prepared by known methods such as (1) preparing a polymer latex (substrate) by polymerizing (in an aqueous emulsion) butadiene or a mixture of butadiene, styrene and up to 10% (based on monomer content of the latex) of acrylonitrile, (2) adding to said latex a mixture of styrene and up to 40% of acrylonitrile or methyl methacrylate (based on monomer content of the added mixture), and (3) polymerizing the mixture of (2). Thus, the polymer latex of (1) may be polybutadiene, a copolymer of butadiene and styrene or a copolymer of butadiene, styrene and acrylonitrile. Up to 70% of styrene, based on the monomer content of the latex may be present in the graft copolymer; and the mixture of (2) may be styrene and acrylonitrile, styrene and methyl methacrylate, or styrene, acrylonitrile and methyl methacrylate.

Cross-linking agents can be used as desired in the above process. They may be used both in the step of preparing the latex and in step (3) involving preparation of the superstrate. Illustrative cross-linking agents include divinylbenzene, and dimethacrylates such as mono-, di-, tri- and tetraethylene glycol dimethacrylate and 1,3-butylene glycol dimethacrylate, triallyl phosphate, triallyl cyanurate, tetraalyl silane, diallyl itaconate, diethylene glycol diacrylate, etc.

Methods of making the graft copolymers herein are well known. U.S. Pat. No. 2,802,808 (Hayes), for example, shows methods of preparing ABS resins, as does also U.S. Pat. No. 2,994,683 (Calvert). The MBS resins and other graft copolymers herein are prepared similarly.

Preferred graft copolymers are those wherein the superstate, i.e., the grafted polymer, is a copolymer of styrene and acrylonitrile and the substrate is polybutadiene. Another preferred species is an MABS resin, i.e., one where the superstrate is a grafted copolymer of acrylonitrile, methyl methacrylate and styrene.

Mixtures of graft copolymers may be used. Thus, two different ABS resins may be used, or a mixture of an ABS resin and an MABS resin, or a mixture of an MBS resin and an MABS resin, or a mixture of two different MABS resins, or a mixture of an ABS resin and two different MABS resins.

A particularly preferred graft copolymer is one wherein a copolymer of from about 70 parts to about 90 parts of styrene and from about 10 parts to about 30 parts of methyl methacrylate is grafted onto a rubber substrate.

Polystyrene

The polystyrene component is that known in the trade as general purpose polystyrene, i.e., the homopolymer. It is semi-linear in structure and is non-linear. Although it is one of the most widely used thermoplastics, by itself it is characterized by limited resistance to weather and by relatively poor impact strength.

Copolymer Blends

The relative proportions of the polymers present in the blend of the invention are from about 30 to about 80 parts of block copolymer, from about 10 to about 10 parts of graft copolymer, and from about 10 to about 40 parts of polystyrene.

The polymer blends herein may be prepared by melt mixing the indicated polymers, usually with intensive mixers, e.g., a Banbury mixer, or with any of variously available single and multi-screw extruders.

The compatibility (1) of the polymeric components of the polyurethane blends herein is shown in Table I. The rating is based on considerations of whether or not a sample (a pressed placque or injection molded placque) delaminates or cracks when bent, and the general homogeneity of appearance of the sample. The samples are rated on a scale of 1–10 where 1 is bad (incompatible) and 10 is good (compatible). Processability (2) (mixing in a Banbury at 160° C. followed by milling on a 2-roll mill) and scruff resistance ratings are also shown, the ratings in these instances being based on scales of 1–10 where 1 is good and 10 is bad.

TABLE I

|     | MABS | ABS | PS | SBS-1 | SBS-2 | SBS-3 | (1) | (2) | (3) |
| --- | ---- | --- | -- | ----- | ----- | ----- | --- | --- | --- |
| 1.  | 20   |     | 20 | 60    |       |       | 8   | 1   | 2   |
| 2.  | 15   |     | 25 | 60    |       |       | 8   | 1   | 3   |
| 3.  | 25   |     | 25 |       |       | 50    | 5.5 | 3   | 2.5 |
| 4.  | 25   |     | 25 | 50    |       |       | 8   | 1   | 4   |
| 5.  | 20   |     | 30 | 50    |       |       | 9.5 | 1   | 4.5 |
| 6.  | 10   |     | 20 |       | 70    |       | 8   | 1   | 4   |
| 7.  | 20   |     | 10 |       | 70    |       | 8   | 1   | 3.5 |
| 8.  |      | 25  | 25 | 50    |       |       | —   | 9   | —   |
| 9.  |      | 15  | 25 | 60    |       |       | 8   | 1   | 3.5 |
| 10. |      | 19  | 19 | 62    |       |       | 8   | 1   | 4   |
| 11. |      | 25  | 25 |       | 50    |       | 8   | 1   | 4   |
| 12. |      | 15  | 25 |       | 60    |       | 8   | 1   | 4   |
| 13. |      | 19  | 19 |       | 62    |       | 8   | 3   | 4   |
| 14. |      | 19  | 19 |       |       | 62    | 9   | 1   | —   |
| 15. |      | 25  | 25 |       |       | 50    | 8   | 1   | 6   |

In the above table the headings have the following meanings:

MABS: A graft copolymer in which the substrate is a 19–57 copolymer of styrene and butadiene and the superstrate is derived from a mixture of 20 parts of methyl methacrylate and 4 parts of acrylonitrile.

ABS: A graft polymer in which the substrate is polybutadiene and the superstrate is derived from a mixture of 32 parts of styrene and 18 parts of acrylonitrile.

SBS-1: A styrene-butadiene-styrene block copolymer containing 0.5% of Irganox 1076 (n-octadecyl 3-(3′,5′-ditertiarybutyl-4-hydroxyphenyl) propionate). It has a Shore A hardness of 65, a tensile strength of 4600 psi, a molecular weight of (GPC) 150,000–200,000, a styrene content of 28%, and a solution viscosity (25% in toluene) of 1220 cps.

SBS-2: Like SBS-1, but contains about 30% of a low aromatic naphthenic oil plasticizer, and has a Shore A hardness of 46.

SBS-3: Like SBS-1, but of slightly higher molecular weight, and contains about 30% of a low aromatic naphthenic oil plasticizer.

PS: Polystyrene.

It will be seen that the blends all are compatible and that some are especially so. These blends, as mentioned earlier, are characterized by good scuff-resistance, gloss, hardness, abrasion resistance, flexibility and impact-resistance. Moreover, they are relatively inexpensive, as compared to polyurethane itself.

All parts and percentages herein, unless otherwise expressly stated, are by weight.

We claim:

1. A blend of polymers consisting essentially (1) from about 30 to about 80 parts of a block copolymer of styrene and a conjugated diolefin of 4–6 carbon atoms, (2) from about 10 to about 40 parts of a graft copolymer wherein a copolymer of styrene and up to 40 parts, based on the weight of a graft copolymer, of acrylonitrile and/or methyl methacrylate is grafted onto a rubbery substrate which is polybutadiene or a copolymer of butadiene and styrene, and (3) from about 10 to about 40 parts of polystyrene.

2. The blend of claim 1 wherein the block copolymer is a copolymer of butadiene and styrene.

3. The blend of polymers of claim 1 wherein the block copolymer is a styrene-butadiene-styrene block copolymer.

4. The blend of polymers of claim 1 wherein the rubbery substrate of the graft copolymers is polybutadiene.

5. The blend of polymers of claim 1 wherein the graft copolymer is prepared by grafting a copolymer of styrene and acrylonitrile onto a rubbery substrate.

6. The blend of polymers of claim 1 wherein the graft copolymer is prepared by grafting a copolymer of styrene and methyl methacrylate onto a rubbery substrate.

7. The blend of polymers of claim 1 wherein the graft copolymer is prepared by grafting a copolymer from about 70 parts to about 90 parts of styrene and from about 10 parts to about 30 parts of methyl methacrylate onto a rubbery substrate.

* * * * *